US008418786B2

(12) United States Patent
Clapp et al.

(10) Patent No.: US 8,418,786 B2
(45) Date of Patent: Apr. 16, 2013

(54) SELECTIVELY POWERED AMBULATORY STRETCHER CHAIR

(75) Inventors: Timothy A. Clapp, Sharon Center, OH (US); Richard E. Cole, Jr., Lagrange, OH (US); Zackary D. McKee, Akron, OH (US); Robert E. Herchick, Copley, OH (US); Michael E. Maske, Scottsdale, AZ (US)

(73) Assignee: TransMotion Medical, Inc., Sharon Center, OH (US)

( * ) Notice: Subject to any disclaimer, the term of this patent is extended or adjusted under 35 U.S.C. 154(b) by 413 days.

(21) Appl. No.: 12/774,988

(22) Filed: May 6, 2010

(65) Prior Publication Data

US 2011/0272200 A1 Nov. 10, 2011

(51) Int. Cl.
*B62D 11/00* (2006.01)
*A47B 7/02* (2006.01)

(52) U.S. Cl.
USPC .................................... 180/6.5; 5/618; 5/624

(58) Field of Classification Search ................. 180/65.1, 180/6.5, 9.48, 907, 65.5, 242; 5/624, 611, 5/618, 616, 608, 614
See application file for complete search history.

(56) References Cited

U.S. PATENT DOCUMENTS

| | | | | |
|---|---|---|---|---|
| 3,284,126 | A * | 11/1966 | Piazza | 5/614 |
| 4,633,962 | A * | 1/1987 | Cox et al. | 180/65.1 |
| 4,847,929 | A * | 7/1989 | Pupovic | 5/608 |
| 5,230,113 | A * | 7/1993 | Foster et al. | 5/608 |
| 5,715,548 | A * | 2/1998 | Weismiller et al. | 5/624 |
| 6,499,163 | B1 * | 12/2002 | Stensby | 5/618 |
| 6,643,873 | B2 * | 11/2003 | Heimbrock et al. | 5/618 |
| 7,398,842 | B2 * | 7/2008 | Fontecchio et al. | 180/6.5 |
| 7,454,805 | B2 * | 11/2008 | Osborne et al. | 5/618 |
| 7,703,158 | B2 * | 4/2010 | Wilker et al. | 5/616 |
| 2011/0277242 | A1 * | 11/2011 | Dionne et al. | 5/611 |

* cited by examiner

*Primary Examiner* — Hau Phan
(74) *Attorney, Agent, or Firm* — Renner, Kenner, Greive, Bobak, Taylor & Weber

(57) ABSTRACT

A selectively powered ambulatory stretcher chair has a bifurcated articulating base of free-wheeling casters at each of the corners thereof, with motor driven wheels on a transaxle interposed therebetween. Articulation of the bifurcated base causes deployment and retraction of the drive wheels to allow use of the stretcher chair in both a manual and power-driven mode, while ensuring stability in both. A u-shaped positionable bar is pivotally connected to a back of the stretcher chair and maintains a control box within a tight range of positions as the chair of the stretcher chair assembly translates between upright and horizontal positions. The back of the stretcher chair is of a radiolucent material, accommodating medical procedures in the stretcher chair in a broad range of positions.

52 Claims, 8 Drawing Sheets

SELECTIVELY POWERED AMBULATORY STRETCHER CHAIR

TECHNICAL FIELD

The invention herein resides in the art of selectively powered caster-wheeled mobile devices such as, but not limited to carts, beds, stretchers and chairs. More particularly, the invention relates to an ambulatory stretcher chair that is selectively powered, and is characterized by mobile stability in both a powered and manual mode of operation. Specifically, the invention relates to a selectively powered ambulatory stretcher chair having a bifurcated articulating base supporting at least one telescoping column for supporting the stretcher chair portion of the mechanism, and in which the powered wheels, when deployed, are particularly supported in a manner to ensure constant contact with the floor or other support surface.

BACKGROUND ART

There is presently a need for patient transport devices in the medical field that utilize a means for power assisting or power driving a stretcher or stretcher/chair to aid care givers and facility personnel in the safe transport of patients throughout the medical facility. This need is most acute when transporting long distances, up inclines, or when the patient is inordinately heavy. In normal practice, medical facility personnel are required to manually push, under their own power, these transport devices. There are currently no known power driven transport devices that can move patients in both a supine (generally horizontal) and upright position. Moreover, known powered patient transport devices are not readily given to accommodating medical procedures upon the patient in both the supine (stretcher) or upright (chair) positions.

Presently known patient transport mechanisms are of a rudimentary nature, not given to high levels of stability in both the powered and unpowered mode of operation, and not accompanied by features conducive to patient accommodation, comfort and safety.

DISCLOSURE OF INVENTION

In light of the foregoing, it is a first aspect of the invention to provide a selectively powered ambulatory stretcher chair having a bifurcated articulating base, supporting a telescoping central column.

Another aspect of the invention is the provision of a selectively powered ambulatory stretcher chair having a pair of drive wheels mounted to a transaxle accommodating side-to-side adjustments for constant traction in uneven terrain.

A further aspect of the invention is the provision of a selectively powered ambulatory stretcher chair employing a push-pull cable to allow locking of freewheeling casters at the distant corners of the bifurcated articulating base.

Still another aspect of the invention is the provision of a selectively powered ambulatory stretcher chair in which the drive wheels may be electronically raised, allowing the four caster wheels at the corners of the base to swivel and accommodate movement in any direction.

Still another aspect of the invention is the provision of a selectively powered ambulatory stretcher chair having a brake for the transaxle.

Yet a further aspect of the invention is the provision of selectively powered ambulatory stretcher chair in which a patient in the supine position is slightly declined in the power mode of operation, and substantially horizontal in the manual mode.

Still another aspect of the invention is the provision of a selectively powered ambulatory stretcher chair in which a single positionable bar is provided for use in both the upright and supine modes of transportation, and in which the positional bar is automatically adjusted based upon the position of the back of the stretcher chair.

A further aspect of the invention is the provision of a selectively powered ambulatory stretcher chair having positionable bar mechanism that totally clears a radiolucent back of the stretcher chair to accommodate upper body x-rays.

Yet an additional aspect of the invention is the provision of a selectively powered ambulatory stretcher chair having a scale or other weight sensing device to limit usage of the ambulatory stretcher chair in the event the weight of the patient exceeds a preset level.

Yet a further aspect of the invention is the provision of a selectively powered ambulatory stretcher chair having a controller with safety features including keypad lockout, accommodation of manual push mode without a key sequence, caster wheel locks, prevention of operation during a charge cycle, automatic shutdown based on preset criteria, and column height extension limits.

Yet another aspect of the invention is the provision of a selectively powered ambulatory stretcher chair having a single battery system to operate two separate and independent control systems for both the stretcher chair articulation and the power drive wheels.

A further aspect of the invention is the provision of a selectively powered ambulatory stretcher chair having a footrest bumper.

Yet another aspect of the invention is the provision of a selectively powered ambulatory stretcher chair having an integrated oxygen tank holder in a base cover.

The foregoing and other aspects of the invention that will become apparent as the detailed description proceeds are achieved by a selectively powered ambulatory transport device, comprising: a base; a patient support structure mounted to said base for receiving and maintaining a patient; wheels attached to said base; and wherein said base is bifurcated into at least two portions, each said portion having at least one of said wheels attached thereto, said at least two bifurcated portions articulating with respect to each other.

Other aspects of the invention are attained by a powered ambulatory stretcher chair, comprising: a wheeled transportable base; a reclinable chair received by said base, said reclinable chair being adjustable between an upright and a horizontal position; and a positionable bar pivotally connected to a back of said reclinable chair, said positionable bar having a controller mounted thereon for actuation by an operator while said operator is centrally positioned behind said reclinable chair.

Still other aspects of the invention are attained by a transport mechanism for a medial cart, comprising: a base; wheels attached to said base; and wherein said base is bifurcated into at least two portions, each said portion having at least one of said wheels attached thereto, said at least two bifurcated portions articulating with respect to each other about an axis orthogonally transverse to said base.

DESCRIPTION OF DRAWINGS

For a complete understanding of the various aspects and structures of the invention, reference should be made to the following detailed description and accompanying drawings wherein.

BEST MODE FOR CARRYING OUT THE INVENTION

Figure 1:
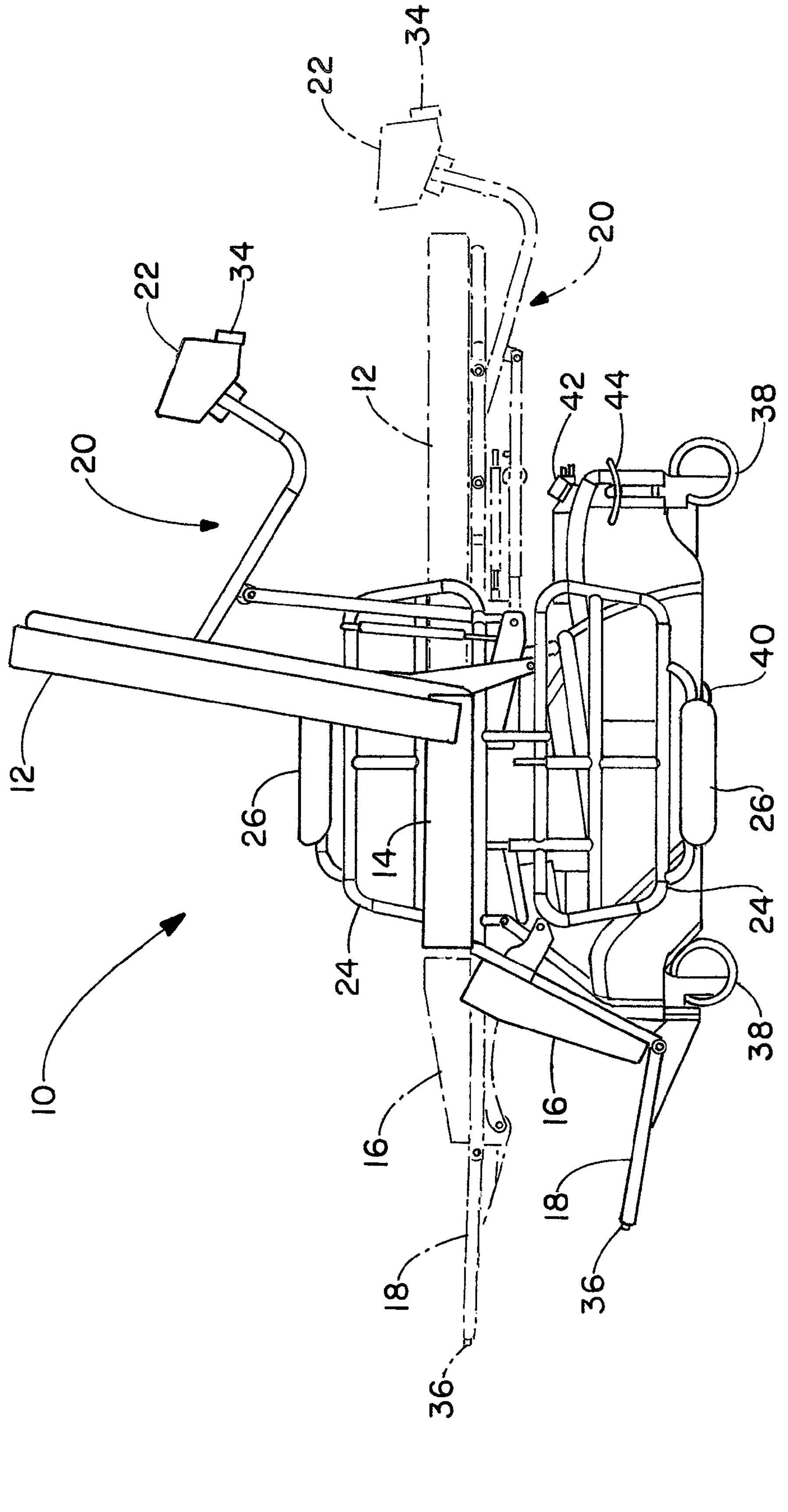
FIG. 1 is a side elevational view of the powered ambulatory stretcher chair of the invention, showing the same in the supine position in phantom.
Figure 2:
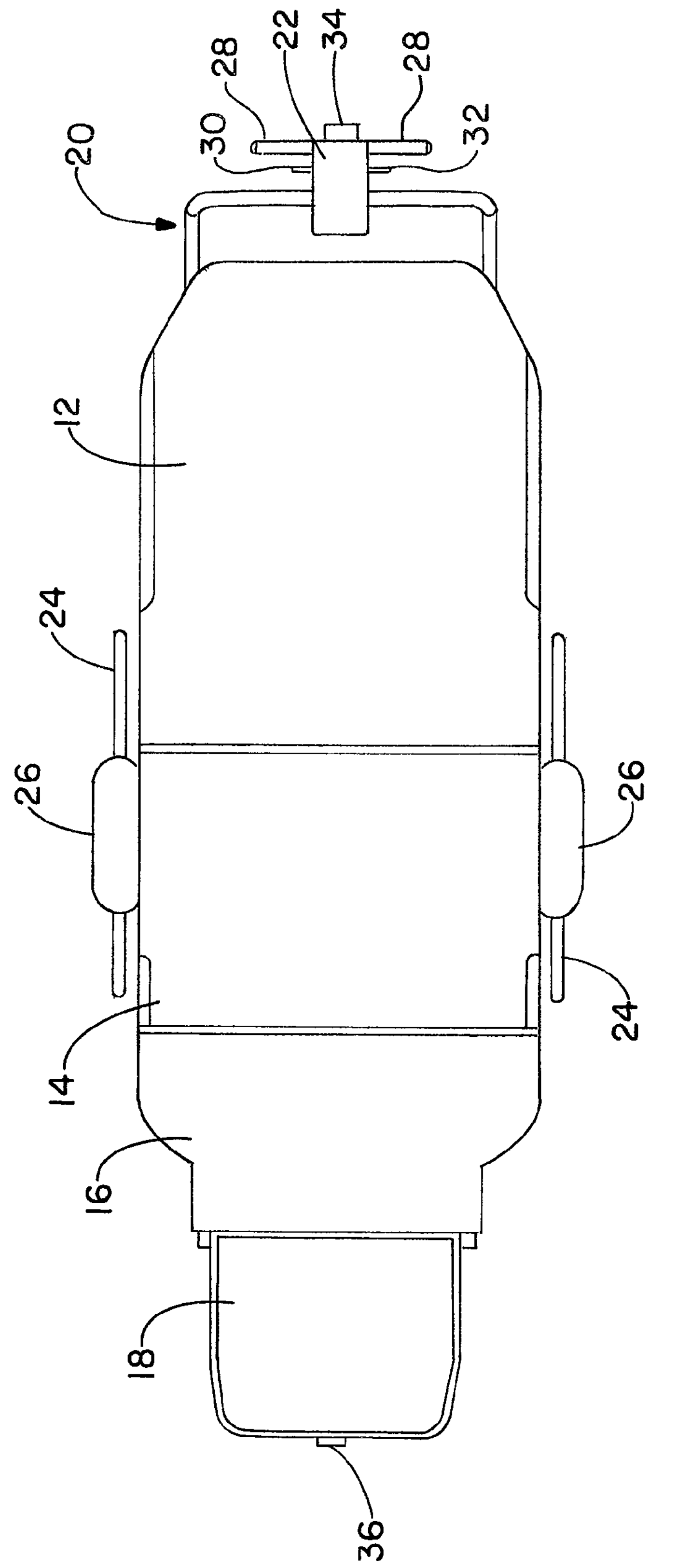
FIG. 2 is a top elevational view of the powered ambulatory stretcher chair of FIG. 1, showing the same in the stretcher or supine position.

Referring now to the drawings and more particularly FIGS. 1 and 2, it can be seen that a powered ambulatory stretcher chair made in accordance with the invention is designated generally by the numeral 10. While the invention is described herein with reference to a stretcher chair, it will be appreciated that the concepts of the invention extend to and include a range of transport devices of the cart type. The stretcher chair 10 includes a back 12 hingedly connected to a seat 14 which, in turn, is hingedly connected to a leg support 16, with a footrest portion 18 hingedly secured to an opposite end thereof. According to a preferred embodiment of the invention, the back 12, seat 14, and leg portion 16 are cushioned with an appropriate cloth covered foam pad or the like, such pads covering a rigid underlayment maintained by an appropriate frame structure, as would be readily appreciated by those skilled in the art. A positionable bar mechanism 20 is hingedly interconnected between the frames of back 12 and the seat 14. An operator control system 22 is mounted upon a free end of the positionable bar mechanism 20, as shown. As will be readily appreciated later herein, the hinged interconnection of the positionable bar mechanism 20 between the frames of the back 12 and seat 14 serve to maintain the operator control system 22 at a convenient height when both in the upright position shown in solid lines in FIG. 1, and the supine or stretcher position as shown in phantom. In a preferred embodiment of the invention, the operator control system 22 transitions within a range of about 10 inches from the upright chair position to the supine stretcher position as shown in FIG. 1.

The stretcher chair 10 is characterized by a pair of side rails 24, one on each side of the stretcher chair 10, and each being provided with an arm rest 26 thereon. As shown in FIG. 1, one of the side rests is shown in the up position, with the other having been pivoted downwardly. It will be appreciated that a second set of side rails may extend from the sides of the back 12, if desired.

A pair of hand grips 28 extends from the operator control system 22, in a direction orthogonal to a main longitudinal axis of the stretcher chair 10. The hand grips 28 are in close positional relationship to a pair of control triggers 30, 32 to mutually exclusively accommodate forward and reverse powered movement of the assembly 10.

A safety limit switch 34 is provided near the head of the stretcher chair 10, and mounted upon the operator control system 22. Preferrably, a proximity sensor 36 is provided on the footrest 18, emitting a signal to the control system 22 when the footrest 18 is undesirably close to an object. Accordingly, at the extreme longitudinal ends of the powered ambulatory stretcher chair 10, safety switches are provided to disable the powered chair, and particularly operation of the drive wheels thereof, in the event of contact with or close proximity to an obstruction. In similar fashion, a kill switch 42 is provided on a base portion of the stretcher chair 10, allowing an operator to depress the same with his/her foot to similarly kill power and/or otherwise disable operation of the stretcher chair 10 if desired. Those skilled in the art will readily appreciate that the safety limit switch 34 is particularly adapted to terminate operation of the stretcher chair 10 if operating in a reverse direction and contacting an operator who is otherwise stationary, as standing against an elevator wall or the like. Similarly, the switch 34 is conveniently located between a user's hands for quick access and immediate stopping in emergency situations.

The ambulatory nature of the stretcher chair 10 is provided by means of caster wheels 38, typically freewheeling and pivotal about a substantially vertical axis. The caster wheels 38 are provided at each of the four corners of the base assembly. A lock pedal 44 is provided to lock operation of the associated rear caster assemblies 38 as by operator actuation. As will become apparent later, at least one of the forward casters is simultaneously locked as by means of an actuating push-pull cable. Finally, it will be appreciated that drive wheels 40 are provided intermediate the caster wheel assemblies 38 and are deployable and retractable as will become apparent below.

Figure 3:
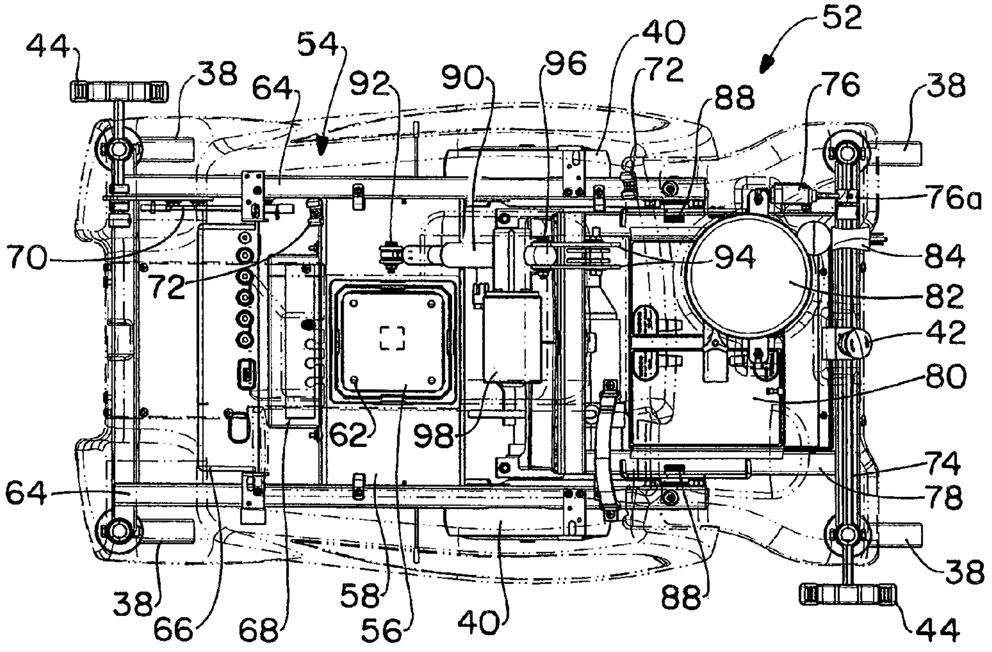
FIG. 3 is a top plan view of the bifurcated articulating base structure of the invention.
Figure 4:
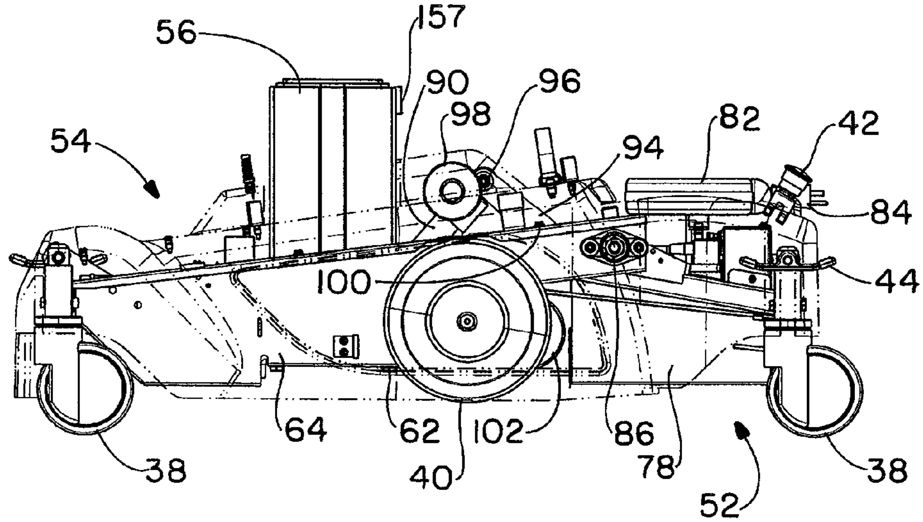
FIG. 4 is a side elevational view of the bifurcated articulating base structure.

With reference now to FIGS. 3 and 4, appreciation can be obtained of the bifurcated articulating base assembly 50 of the invention. As shown, the base assembly 50 includes a bogey wheel assembly or platform 52 that is hingedly and operatively connected to a front wheel platform 54. The bogey wheel platform 52 carries a rear pair of caster wheel assemblies 38 and a pair of drive wheels 40. The front wheel platform 54 carries a front pair of caster wheel assemblies 38 and a telescopic column 56 mounted on a base plate 58. The telescopic column 56 has a height sensor 57 attached thereto or in communication therewith to sense and emit a signal indicating the extension of the column 56 and/or that a maximum allowable extension has been reached. In a preferred embodiment of the invention, a force transducer 60 is mounted between the base of the column 56 and base plate 58, or between the seat 14 and top of column 56, providing signals on the leads thereof corresponding to the weight imparted thereto. These signals can indicate the weight of the patient being transported and, through a controller, preclude operation if the weight is excessive, to a degree of rendering the stretcher chair 10 unstable or otherwise unsafe for operation. As shown, a plurality of nut and bolt assemblies 62 are employed to secure the telescopic column 56 to the base plate 58.

The front wheel platform 54 includes a frame 64 of appropriate rigid metal construction of plates and channels to provide a supporting structure for the stretcher chair 10. A control box 66 is mounted to the frame 64 and contains therein appropriate wiring and circuitry for controlling the operation of the chair. This circuitry, known in the art, controls the selective movement of the chair back, seat, leg and foot rests between upright and horizontal positions. A motor controller 68 is also provided on the frame 64 and adjacent the telescopic column 56, for raising and lowering the same in standard fashion.

In a preferred embodiment of the invention, at least three of the caster wheel assemblies 38 include a brake for inhibiting rotation of the caster wheels and locking the same, thus precluding further movement of the stretcher chair 10. As shown, a pair of lock pedals 44 is provided for this purpose. A first lock pedal 44 is associated with a pair of rear caster assemblies 38, while another lock pedal 44 is associated with a forward one of the caster wheels 38. Actuation of either of the lock pedals 44 will simultaneously lock the rearward pair of caster wheels 38 and the forward caster wheel 38 having a lock pedal 44 associated therewith. The concurrent actuation is achieved by the use of a push-pull cable 70, mounted by appropriate clips 72 and extending between the bogey wheel platform 52 and front wheel platform 54. A lock brake rod 74 extends between the rear caster assemblies 38 and interconnects these caster assemblies of the bogey wheel platform 52. The locking caster wheel assembly 38 of the front wheel platform 54 is interconnected through the push-pull cable 70 and associated cams with the lock brake rod 74. Accordingly, actuation of either lock pedal 44 locks the three associated caster wheel assemblies 38, inhibiting mobility of the stretcher chair 10. Those skilled in the art will appreciate that a second lock brake rod 74 could extend between the front caster wheel assemblies 38 of the front wheel platform 54 if locking of all four wheels were desired. It will be appreciated that the push-pull cable is flexible enough to accommodate articulation of the base assembly 50, as will be discussed below, but rendered sufficiently rigid as by being secured by spaced clips 72 to accommodate both push and pull operations. A locked wheel sensor or limit switch 76 is activated by a cam 76*a* mounted on the lock brake rod 74 to emit a signal indicating whether the associated caster wheel assemblies 38 are locked or free-wheeling.

With continued reference to FIGS. 3-6, it can be seen that the bogey wheel platform 52 includes a metal frame 78 of appropriate plates and channel members to provide the necessary and desired strength and rigidity. The bogey wheel platform 52 carries a pair of batteries 80 and associated battery charger assembly 80*a*. A cord reel 82 receives an electrical cord and associated plug 84, the same being adapted for connection with an AC wall outlet for charging the pair of batteries 80 through the charger assembly 80*a*. For purposes of clarification, the cord reel assembly 82 has been removed in FIGS. 5 and 6.

As best shown in FIGS. 3 and 4, the bogey wheel platform 52 and front wheel platform 54 are hingedly or pivotally interconnected by means of a pair of oppositely disposed bushing mount assemblies 86 between the frames 64 and 78 thereof. The secured engagement of the bushing mounts, comprising bushings, washers, bearings and the like, is made through shoulder bolts 88. This bushing mount interconnection allows for the desired and necessary articulation between the bogey wheel platform 52 and front wheel platform 54, as will become apparent below.

Figure 5:
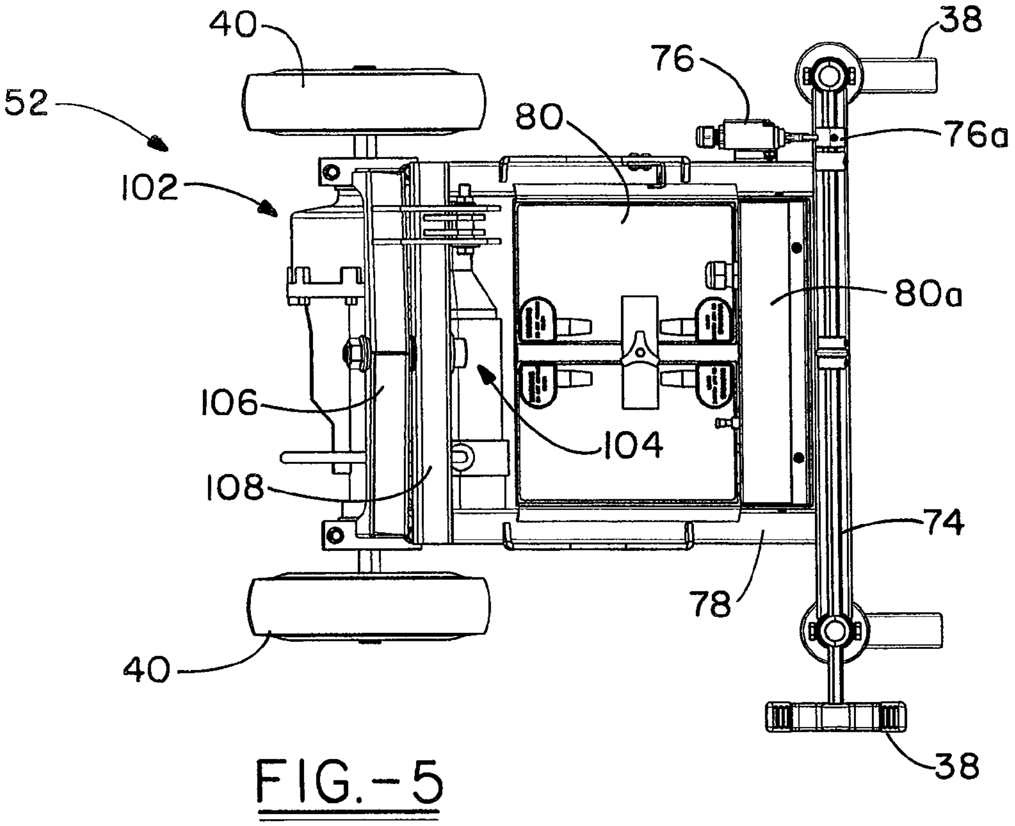
FIG. 5 is a top plan view of the bogey wheel system of the bifurcated articulating base.
Figure 6:
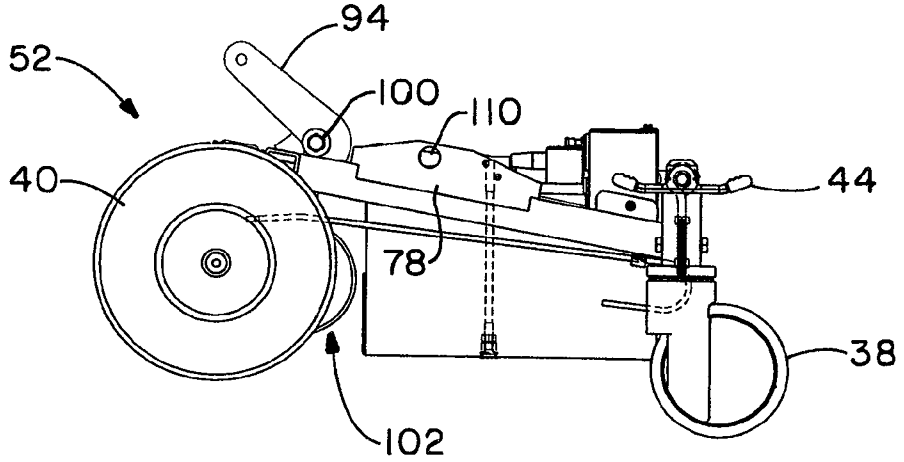
FIG. 6 is a side elevational view of the bogey.

A linear actuator 90 is secured to the base plate 58 of the front wheel platform 54 by means of a bolt and bushing assembly 92. A crank arm 94 is connected to an end of the linear actuator 90 by an appropriate bushing assembly 96. An actuator motor 98 is secured to and extends from a cylinder of the linear actuator 90. The crank arm 94 is pivotally supported at 100 to the frame 78 of the bogey wheel platform 52. As best shown in FIGS. 5 and 6, the drive wheels 40 are powered by a transaxle motor assembly 102. A bolt and bushing assembly 104 accommodates slight pivotal movement of the transaxle assembly 102 and associated drive wheels 40. In this regard, the transaxle motor assembly 102 is secured to a cross channel member 106. A corresponding cross channel member 108 is fixedly secured to, and forms a portion of, the frame 78 of the bogey wheel platform 52. Accordingly, the bolt and bushing assembly 104, securing the cross channel members 106, 108 together, allows for slight pivotal movement, limited by stops or the like (not shown) of the transaxle assembly 102 with regard to the bifurcated articulating base assembly 50. In a preferred embodiment of the invention, the pivotal movement is limited to approximately plus or minus 8° about the pivot of the bolt and bushing assembly 104, to accommodate anomalies in the surface upon which the powered ambulatory stretcher chair 10 is received.

As shown in FIG. 6, the aperture 110 in the frame 78 of the bogey wheel platform 52 is provided for receiving the bushing mount 86, discussed above. Of course, a pair of such apertures 110 is provided in alignment on opposite sides of the frame assembly 78. These apertures provide a pivot axis for the platforms 52, 54 that is parallel to the axis of the transaxle motor assembly 102. The majority of the weight of the stretcher chair 10 and patient is carried by the drive wheels 40 and caster wheels 38 of the bogey wheel platform 52. This entire arrangement has been found to result in a smaller base footprint over the prior art, with improved traction, stability and center of gravity, allowing for improved steering and handling. On flat surfaces, all four caster wheels 38 contact the surface along with the two drive wheels 40.

It should be noted that the transaxle motor assembly is preferably provided with a spring-applied internal brake serving to lock the drive wheels 40 when the motor is not actuated, thus preventing unintentional movement of the stretcher chair 10, particularly when left on an incline with the caster wheels unlocked. This lock mechanism is electronically disengaged on motor actuation. A pull lever is associated with the transaxle assembly 102 to allow manual release of the lock mechanism in the absence of power.

Figure 7:
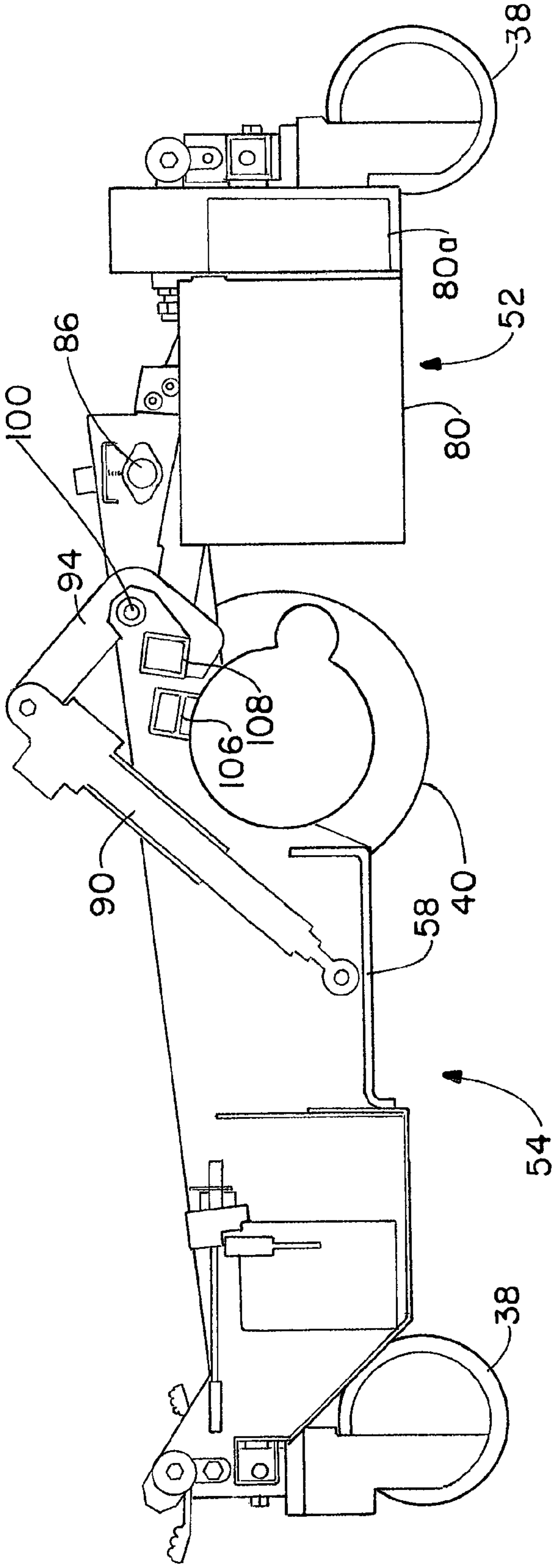
FIG. 7 is an illustrative side elevational view of the bifurcated articulating base of the invention showing the linear actuator interconnection therebetween.

With reference to FIGS. 3-7, and particularly the illustration of FIG. 7, an appreciation can be obtained regarding the structure and operation of the means and methodology for articulating the base assembly 50. As shown, the linear actuator 90 may be actuated by the associated motor 98 to extend from its securement to the base plate 58. This causes the crank arm 94 to pivot about the pivot mount 100 to engage the cross channel member 108 of the frame 78 of the bogey wheel platform 52. This lifts the forward end of the bogey wheel platform 52 and the transaxle motor assembly 102 and associated drive wheels 40, through interconnection between the channel members 108 and 106. Accordingly, the drive wheels 40 are lifted from the floor or supporting surface, as the longitudinally displaced caster wheel assemblies 38 are drawn slightly toward each other, with the rear caster wheel assemblies moving from a slightly rearwardly canted position to a substantially vertical position. In this position, the stretcher chair 10 lacks powered mobility, but may be moved in a freewheeling manner.

Deployment of the transaxle motor assembly 102 and associated drive wheels 40 is reversed from that just described. The motor 98 causes contraction of the linear actuator 90, allowing the crank arm 94 to rotate in a counterclockwise manner as shown in FIG. 7, thus allowing the interconnected channel members 108, 106 to lower until the drive wheels 40 contact the floor, at which time a slight clearance exists between the crank arm 94 and the channel member 108. In this position, the four caster wheels 38 and the two drive wheels 40 are in contact with the floor or supporting surface, and the longitudinally displaced pairs of caster wheels 38 have separated slightly, with the rear caster wheel assemblies 38 being canted outwardly, thus slightly lowering the rear of the base assembly 50, and the head of the patient in the supine position for comfortable transport. Similarly, even when in the upright position, the back 12 is given a slight rearward tilt for patient comfort, if transported in that position. The resultant tilt of the column 56 is on the order of 1-5 degrees, and preferably 2 degrees.

It will be appreciated that the bifurcated articulating base assembly 50 allows for safe and secure deployment and retraction of the drive wheels 40, while the pivotally engaged transaxle motor assembly 102, being allowed to pivot on the order of plus or minus 8° about the bushing assembly 104, accommodates transitions over uneven flooring, the negotiation of ramp surfaces, and the like. The combination of caster wheel assemblies 38 at the corners of the bifurcated articulating base assembly 50, with the pair of drive wheels 40 interposed therebetween, allows the combined weight of the patient and stretcher chair assembly 10 to so load the base assembly as to ensure constant contact of the drive wheels 40 with the floor or other support surface. Similarly, the transaxle assembly 102 is positioned slightly behind the center of gravity of the loaded selectively powered ambulatory stretcher chair 10 and toward said rear bogey wheel platform 52 for purposes of stability.

Figure 8:
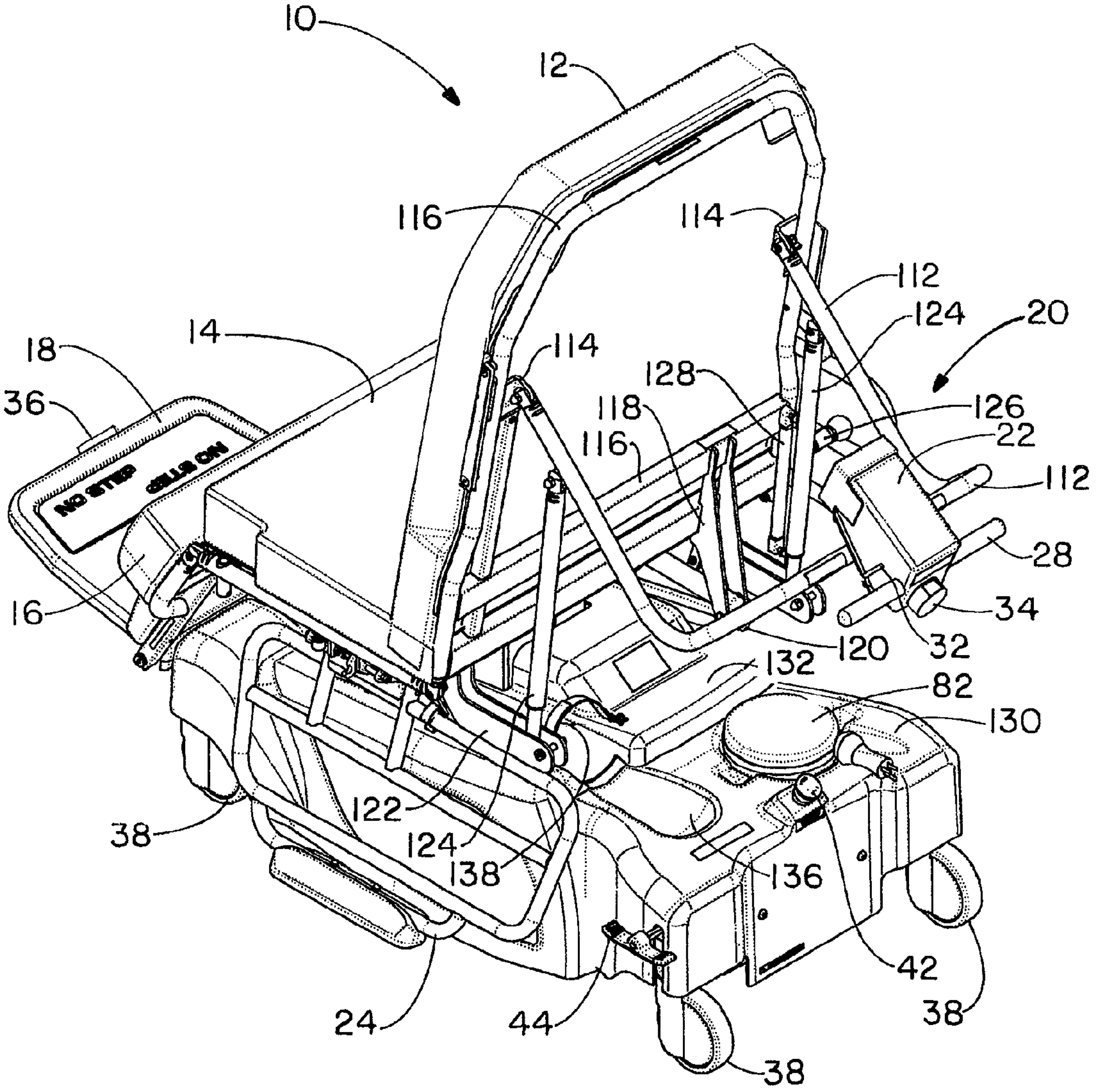
FIG. 8 is an orthogonal view of the powered ambulatory stretcher chair of the invention taken from a rear corner thereof.

An appreciation of yet additional features of powered ambulatory stretcher chair 10 may be attained with reference to FIG. 8. As shown, the positionable bar mechanism 20 includes a tubular handle frame assembly 112, of u-shaped configuration, bridging the back 12 and hingedly secured as at 114 to side edges of the back frame 116. The tubular handle frame assembly 112 receives and maintains the operator control system 22, hand grips 28 and safety limit switch 34, as shown.

A bracket 118 is fixedly secured to the back frame 116 and is pivotally connected to an appropriate linear actuator 120 as illustrated. It will be appreciated that actuation and control of the actuator 120 allows the seat back 12 to tilt between a near fully upright position to a substantially supine or horizontal position.

A second bracket 122 is also fixed to the back frame 116. A telescoping rod 124 is pivotally secured as by a shoulder bolt or the like to an end of the bracket 122 at one end thereof and is similarly pivotally connected at the other end thereof to the tubular handle frame assembly 112. A spring-biased release pin 126 normally engages the telescoping rod 124 to securedly interengage the inner and outer cylinders thereof, and to prevent telescoping operation thereof. In other words, absent actuation of the release pin 126, the telescoping rod 124 is of fixed length. A gas spring 128 is interconnected between the inner and outer cylinders of the telescoping rod 124, as shown.

It will be appreciated that the particular benefit of the instant invention is the ability to perform certain procedures on a patient while the patient is maintained by the stretcher chair 10. One such procedure is that of taking x-rays of the patient, and the ability to do so with the patient in either an upright or horizontal position. In that regard, the seat back 12 is radiolucent, providing no obstruction to radiology equipment or energy. It is simply required that the positionable bar mechanism 20 not obstruct the procedure. Accordingly, if an x-ray is to be performed through the back 12, with the back 12 in an upright position, the release pin 126 may be disengaged from the inner and outer cylinders of the telescoping rod 124, such that the gas spring 128 causes separation of those cylinders and elongation of the telescoping rod 124. Accordingly, the tubular handle frame assembly 112 pivots fully upwardly, making the entirety of the back 12 accessible by radiological equipment. When the procedure is concluded, the tubular handle frame assembly 112 may be pivoted downwardly about the pivot points 114 until the spring biased locking pin 126 engages the inner and outer cylinders of the telescoping rod 124, thus repositioning the push bar mechanism 20.

It will be appreciated that the u-shaped nature of the tubular handle frame assembly 112, and the positioning of the bracket 122 and telescoping rod 124 at one side of the back frame assembly 116, renders the back 12 totally unobscured when the handle frame assembly 112 is lifted as just described.

Figure 9:
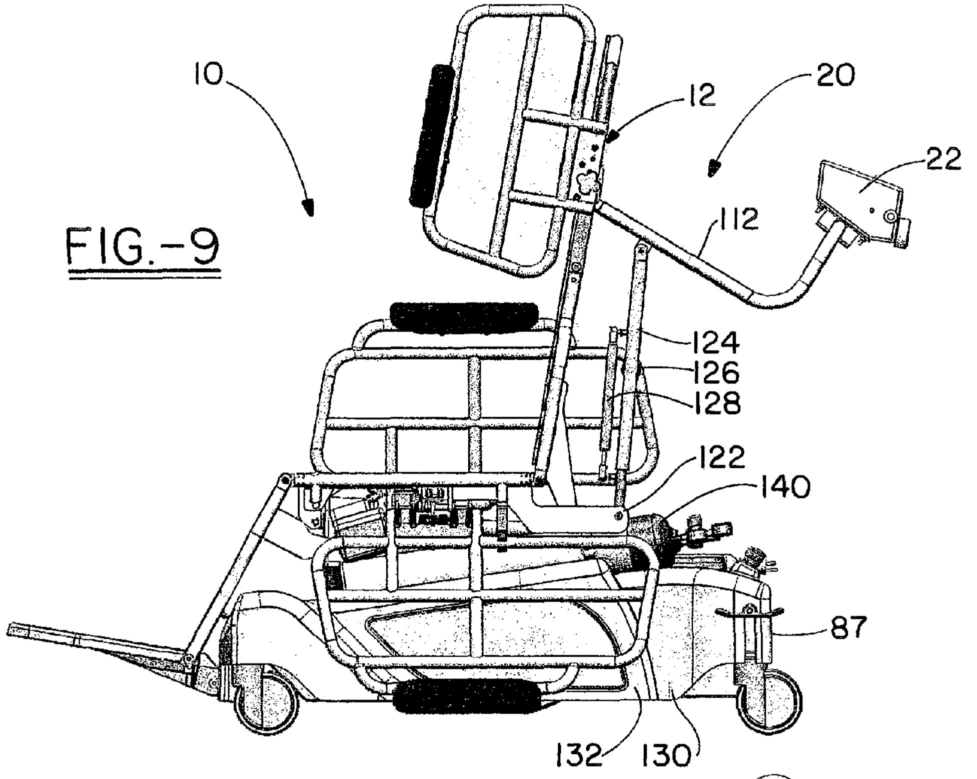
FIG. 9 is a side elevational view of the frame of the powered ambulatory stretcher chair of the invention in the upright position.
Figure 10:
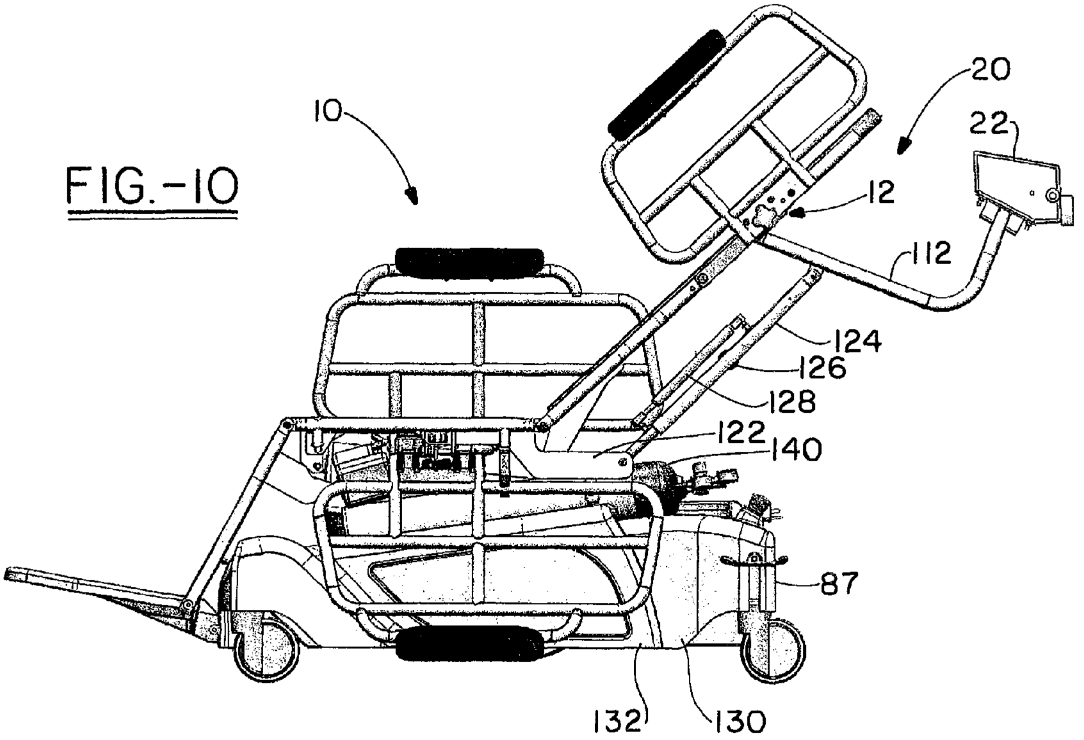
FIG. 10 is a side elevational view of the frame of the powered ambulatory stretcher chair of the invention in a transitional position between upright and supine.
Figure 11:
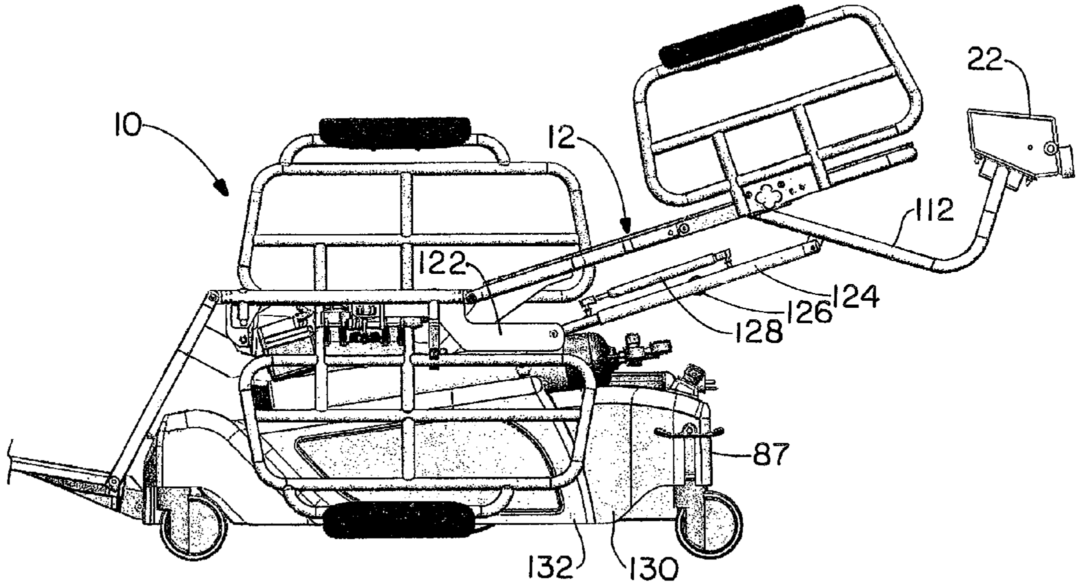
FIG. 11 is a side elevational view of the frame of the powered ambulatory stretcher chair of the invention with the same in a near-supine position.

With reference now to FIGS. 9-11, another feature of the tubular handle frame assembly 112 can be appreciated. In this regard, it is desired that the operator control system 22 and associated hand grips 28 be at substantially the same height regardless of the angle of inclination of the back 12, from fully supine to upright. The hinged nature of the tubular handle frame assembly 112 and the telescoping rod 124, when maintained of fixed length by engagement of the locking pin 126, achieves this feature. The chair assembly 10 is shown in FIGS. 9-11 without cushions or the like, in order to appreciate an understanding of the operation of the handle frame assembly 112. Beginning with FIG. 9, the back 12 is progressively lowered from a substantially upright to a near-supine position. During this transition, the operator control system 22 and associated hand grips 28 (not shown) remain at substantially the same elevation, rendering the chair 10 very user friendly. This is achieved by maintaining the length of the telescoping rod 124, and thus the separation between the bracket 122 and tubular handle frame assembly 112, with the handle frame assembly 112 being pivotally mounted as at 114 to the back frame. In a preferred embodiment of the invention the controller 22 only moves within a range of approximately 10 inches as the back 12 moves from a full upright to a full horizontal or supine position. Accordingly, once the desired height of the stretcher chair is set by standard means operating the column 56, the hand grips 28 stay in a close range throughout manipulation of the stretcher chair elements 12-18, assuring user comfort.

With continuing reference to FIGS. 8-11, it will be appreciated that the base assembly and the operative mechanisms contained thereby are shielded and covered by a two piece cover system comprising covers 130, 132. Because the base is bifurcated and articulating, it slightly changes size and configuration as the drive wheels 40 are deployed and retracted, as discussed above. Accordingly, the covers 130, 132 overlay each other to accommodate slight movement therebetween. Moreover, the two piece cover mechanism accommodates the ability to remove only those portions of the cover that are necessary to access any parts of the stretcher chair 10 requiring service or attention. As shown in these figures, a recess 136 and associated straps 138 are provided for receiving and maintaining an oxygen tank 140. Other such recesses or other configurations are also possible.

Figure 12:
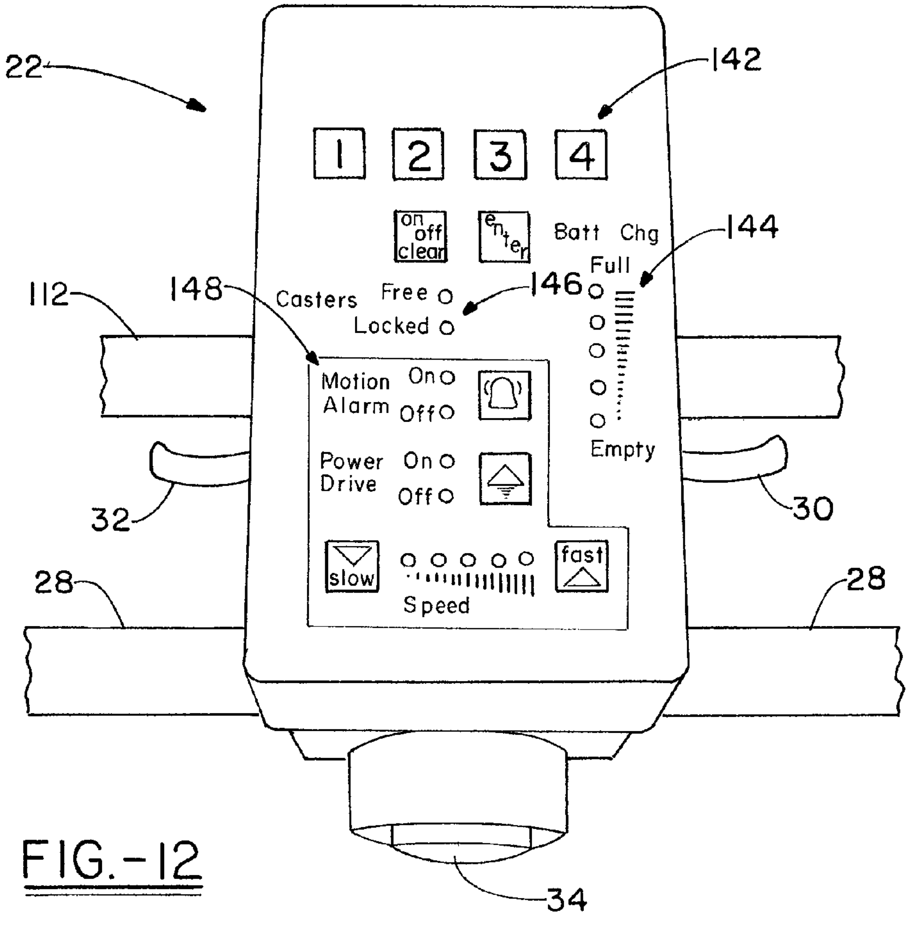
FIG. 12 is a front elevational view of the operator control box of the invention.

With reference now to FIG. 12, an appreciation can be obtained regarding the operator control system 22 of the invention. Those skilled in the art will appreciate that the functions described above and addressed here are readily adapted to software and firmware configurations in a chip housed within the controller 22. Suffice it to say at this time that the controller 22 is positioned centrally between the hand grips 28 upon the handle frame assembly 112 and includes a pair of triggers 30, 32, which may connect to any of various types of devices such as switches, linear variable differential transformers, rotary variable differential transformers, or digital encoders to select forward or reverse operation of the drive wheel 40 through control of the motor 102. The triggers 30, 32 can be used for selecting both direction and speed of operation as desired.

The controller 22 also includes a keypad entry area 142. First, the "On/Off Clear" button is activated to enable the controller 22. Then the operator or user enters an access code, followed by the "Enter" button. Upon entry of the appropriate code, the user may activate and employ the power drive capabilities of the chair 10 by actuation of the motor driven transaxle assembly 102. Absent entry of the code, manual transport by means of the caster wheel assemblies 38 is possible, as well as raising, lowering and manipulating the chair structure 12-18.

The controller 22 includes an indicator 144 regarding the status of the charge of the batteries 80. A plurality of lights indicate that level. Similarly, an indicator 146 is provided on the controller 22 to indicate whether the caster wheels 38 are locked or free, as by monitoring the sensor switch 76. Further portions of the control system 22 are shown at 148 as including a motion alarm switch allowing activation and deactivation of an audible indicator when the triggers 30, 32 are used. Also included is a power drive monitor, allowing the operator to engage or disengage the power drive, by depressing a pad, and with an indicator indicating the selection and whether the power drive wheels 40 are up or down. When the power drive is turned on, the linear actuator 90 is driven by the motor 98 to allow the drive wheels 40 to engage the floor surface and be driven by the transaxle motor assembly 102. In the off position, the linear actuator 90 lifts the drive wheels 40 and associated power drive transaxle assembly 102 such that only manual movement of the stretcher chair 10 is possible. Finally, a pair of actuator pads for increasing or decreasing the maximum available speed of travel or power to the transaxle motor assembly 102 is provided with the controller 22. Again, visual indicia is provided by means of light emitting diodes or the like to show the speed selected. Selection of speed on the key pad sets the maximum speed that might be attained by full actuation of the triggers 30, 32.

In use, it is contemplated that the controller 22 and associated keypad may limit certain uses to particular individuals—those having knowledge of an access code. The code may authorize an individual for all uses or only predetermined uses. Of course, manual push mode, using the casters 38 only, can be employed without code access or authorization. It is further contemplated, as both a safety and economy concern, that the controller 22 may cause an automatic shut down and shut off of the power to the stretcher chair 10 in the event of non-use for a set period of time, such as five minutes. The controller also communicates with and renders appropriate control signals in response to the weight signal from the transducer 60, the signal from the locked wheel sensor 76, the kill switch 42, and a column height sensor or limit switch 57 associated with the column 56. A similar signal may be received and utilization precluded when actuation of the battery charger is noted.

Thus it can be seen that the various aspects of the invention have been achieved by the structure and operational techniques presented and described above. A powered ambulatory stretcher chair is uniquely provided with a bifurcated articulating base assembly, providing enhanced stability and mobility of the unit in a safe and cost effective manner. The employment of a bogey wheel platform hingedly interconnected with a front wheel platform ensures this safe and secure operation and the ability to negotiate travel surfaces that are uneven or otherwise depart from the desired planar surface.

While in accordance with the patent statutes only the best mode and preferred embodiment of the invention has been presented and described in detail, it is to be understood that the invention is not limited thereto or thereby. Accordingly, for an appreciation of the scope and breadth of the invention reference should be made to the appended claims.

What is claimed is:

1. A selectively powered ambulatory transport device, comprising:

a base;

a patient support structure mounted to said base for receiving and maintaining a patient;

wheels attached to said base; and wherein said base is bifurcated into at least two portions, each said portion having at least one of said wheels attached thereto, said at least two bifurcated portions articulating with respect to each other, a first portion of said at least two portions of said base comprising a first bogey wheel platform having at least one free-wheeling wheel and at least one drive wheel, said drive wheel being maintained on a motor driven transaxle parallel to said axis, and a second portion of said at least two portions of said base comprising a second wheel platform.

2. The selectively powered ambulatory transport device according to claim 1, wherein said patient support structure comprises a stretcher chair translatable between a chair position and a stretcher position.

3. The selectively powered ambulatory transport device according to claim 2, wherein said two portions of said base articulate about an axis orthogonally transverse to said base.

4. The selectively powered ambulatory transport device according to claim 3, wherein said first bogey wheel platform maintains a pair of free-wheeling wheels and said transaxle maintains a pair of drive wheels.

5. The selectively powered ambulatory transport device according to claim 4, wherein said second wheel platform maintains a pair of free-wheeling wheels and has a column extending therefrom and supporting said stretcher chair.

6. The selectively powered ambulatory transport device according to claim 5, further comprising an actuator in operative engagement between said second wheel platform and first bogey wheel platform for effecting articulation therebetween.

7. The selectively powered ambulatory transport device according to claim 5, wherein said motor driven transaxle is pivotally mounted to said first bogey wheel platform, accommodating tilting of said transaxle in a plane orthogonally traversing said base.

8. The selectively powered ambulatory transport device according to claim 7, wherein a weight of the selectively powered ambulatory transport device and patient causes said drive wheels, connected to said pivotally mounted transaxle, to maintain contact with uneven or discontinuous floor surfaces.

9. The selectively powered ambulatory transport device according to claim 5, wherein said transaxle is positioned behind a center of gravity of the selectively powered ambulatory transport device in a direction toward said free-wheeling wheels of said first bogey wheel platform when a patient is received and maintained by said stretcher chair.

10. The selectively powered ambulatory transport device according to claim 4, wherein said motor driven transaxle has a brake that is mechanically set in the absence of power to said motor, and electrically released upon the application of power to said motor.

11. The selectively powered ambulatory transport device according to claim 4, further comprising an actuator in operative engagement between said second wheel platform and first bogey wheel platform, said actuator effecting deployment and retraction of said drive wheels into and out of engagement with a floor surface.

12. The selectively powered ambulatory transport device according to claim 11, wherein said free-wheeling wheels of said second wheel platform and said first bogey wheel platform are positioned for constant contact with a planar floor surface both when said drive wheels are deployed and retracted.

13. The selectively powered ambulatory transport device according to claim 12, wherein said free-wheeling wheels are caster wheels having a push-pull brake cable extending between at least one caster wheel of said first bogey wheel platform and one caster wheel of said second wheel platform, said push-pull brake cable being operative over a range of states of articulation of said bifurcated base.

14. The selectively powered ambulatory transport device according to claim 13, wherein each of said second wheel platform and said first bogey wheel platform has a caster wheel with a brake pedal actuator, actuation of either brake pedal engaging or releasing all casters having a brake associated therewith.

15. The powered ambulatory stretcher chair according to claim 14, wherein said positionable bar is substantially u-shaped and said back of said reclinable chair is radiolucent.

16. The powered ambulatory stretcher chair according to claim 15, wherein said positionable bar is secured to a telescopic rod interconnected with a gas spring, said telescopic rod being normally locked to a fixed length and being extended by said gas spring to move said positionable bar to said position rendering said back or said reclinable chair fully exposed and unobscured upon being unlocked.

17. A powered ambulatory stretcher chair, comprising:

- a wheeled transportable base;
- a reclinable chair received by said base, said reclinable chair being adjustable between an upright and a horizontal position; and
- a positionable bar pivotally connected to a back of said reclinable chair, said positionable bar having a controller mounted thereon for actuation by an operator while said operator is centrally positioned behind said reclinable chair, said controller comprising a pair of oppositely extending hand grips, and further comprising a pair of triggers, one associated with each said hand grip, said triggers controlling a direction of movement of said wheeled transportable base.

18. The powered ambulatory stretcher chair according to claim 17, wherein said positionable bar is selectively moveable to a position rendering said back of said reclinable chair fully exposed and unobscured for radiological procedures.

19. The powered ambulatory stretcher chair according to claim 17, wherein said positionable bar is pivotally connected to a linkage of fixed length, said linkage maintaining said controller at a substantially constant height during transition of said back from upright to said horizontal positions.

20. The powered ambulatory stretcher chair according to claim 19, wherein maintenance of a substantially constant height is achieved by translation of said back without additional user action.

21. The powered ambulatory stretcher chair according to claim 19, wherein said linkage is telescopic, being of fixed length or extending length upon release of a lock.

22. The powered ambulatory stretcher chair according to claim 17, wherein said triggers also control a speed of movement of said wheeled transportable base.

23. The powered ambulatory stretcher chair according to claim 22, wherein a safety limit switch extends outwardly from said controller toward an operator.

24. The powered ambulatory stretcher chair according to claim 17, wherein a weight measuring device is in communication with said reclinable chair and said controller, said controller limiting use of the powered ambulatory stretcher chair as a function of the weight measured by said weight measuring device.

25. The powered ambulatory stretcher chair according to claim 24, wherein said weight measuring device comprises a force transducer interposed between said base and said reclinable chair and wherein use of said powered ambulatory stretcher chair is limited to manual operation when said measured weight exceeds a threshold.

26. The powered ambulatory stretcher chair according to claim 24, wherein said reclinable chair is elevatable, and said controller limits operation of the powered ambulatory stretcher chair as a function of an extent of elevation of said reclinable chair.

27. A powered ambulatory stretcher chair, comprising:

- a wheeled transportable base;
- a reclinable chair received by said base, said reclinable chair being adjustable between an upright and a horizontal position;
- a positionable bar pivotally connected to a back of said reclinable chair, said positionable bar having a controller mounted thereon for actuation by an operator to control selected functions of the powered ambulatory stretcher chair while said operator is centrally positioned behind said reclinable chair; and
- wherein said wheeled transportable base is selectively motor driven and said controller comprises a keypad requiring an access code for actuating said motor.

28. The powered ambulatory stretcher chair according to claim 27, wherein certain of said selected functions of the powered ambulatory stretcher chair are capable in the absence of entry of said access code.

29. The powered ambulatory stretcher chair according to claim 27, wherein said controller monitors a condition of wheel locks and limits utility of the powered ambulatory stretcher chair as a function thereof.

30. The powered ambulatory stretcher chair according to claim 27, wherein said controller precludes certain functionality of said powered ambulatory stretcher chair during such time that batteries of said powered ambulatory stretcher chair are being charged.

31. The powered ambulatory stretcher chair according to claim 27, wherein said controller shuts down certain power mobility of said powered ambulatory stretcher chair in the absence of powered activity after a predetermined period of time.

32. A transport mechanism for a medical cart, comprising:

- a base;
- wheels attached to said base; and
- wherein said base is bifurcated into at least two portions, each said portion having at least one of said wheels attached thereto, said at least two bifurcated portions articulating with respect to each other about an axis orthogonally transverse to said base, a first of said two portions of said base comprising a first bogey wheel platform, and a second of said two portions of said base comprising a second wheel platform, and said first bogey wheel platform maintaining at least one free-wheeling caster and at least one drive wheel, said drive wheel being maintained on an axle parallel to said axis.

33. The transport mechanism for a medical cart according to claim 32, further comprising an actuator in operative engagement between said second wheel platform and first bogey wheel platform for effecting articulation therebetween.

34. The transport mechanism for a medical cart according to claim 33, wherein said axle is pivotally mounted to said first bogey wheel platform, accommodating tilting of said axle in a plane orthogonally traversing said base.

35. The transport mechanism for a medical cart according to claim 34, wherein said actuator effects deployment and retraction of said drive wheels into and out of engagement with a floor surface.

36. The transport mechanism for a medical cart according to claim 35, wherein said free-wheeling casters of said second wheel platform and said first bogey wheel platform are positioned for constant contact with a planar floor surface both when said drive wheels are deployed and retracted.

37. The transport mechanism for a medical cart according to claim 36, wherein said casters have a push-pull brake cable extending between at least one caster of said first bogey wheel platform and one caster of said second wheel platform, said push-pull brake cable being operative over a range of states of articulation of said bifurcated base.

38. The transport mechanism for a medical cart according to claim 37, wherein each of said second wheel platform and said first bogey wheel platform has a caster with a brake pedal actuator, actuation of either brake pedal engaging or releasing all casters having a brake associated therewith.

39. A selectively powered transport device, comprising:

a base;

a support structure mounted to said base for receiving and maintaining an object to be transported;

castered wheels attached to said base; and wherein said base is bifurcated into a first bogey platform and a second wheel platform articulating with respect to each other about an axis orthogonally traverse to said base, each said platform having at least one of said castered wheels attached thereto, said first bogey wheel platform further maintaining at least one drive wheel maintained on a motor driven axle, and at least one free-wheeling castered wheel.

40. The selectively powered transport device according to claim 39, wherein said motor driven axle is parallel to said axis.

41. The selectively powered transport device according to claim 40, wherein said axle is a transaxle and said first bogey wheel platform maintains a pair of free-wheeling castered wheels and said transaxle maintains a pair of drive wheels.

42. The selectively powered transport device according to claim 41, wherein said second wheel platform maintains a pair of free-wheeling castered wheels and has a column extending therefrom and supporting said support structure.

43. The selectively powered transport device according to claim 42, further comprising an actuator in operative engagement between said second wheel platform and first bogey wheel platform for effecting articulation therebetween.

44. The selectively powered transport device according to claim 42, wherein said motor driven transaxle is pivotally mounted to said first bogey wheel platform, accommodating tilting of said transaxle in a plane orthogonally traversing said base.

45. The selectively powered transport device according to claim 44, wherein a weight of the selectively powered transport device and object to be transported causes said drive wheels, connected to said pivotally mounted transaxle, to maintain contact with uneven or discontinuous floor surfaces.

46. The selectively powered transport device according to claim 42, wherein said transaxle is positioned behind a center of gravity of the selectively powered transport device in a direction toward said free-wheeling castered wheels of said first bogey wheel platform when the object to be transported is received and maintained by said support structure.

47. The selectively powered transport device according to claim 41, wherein said motor driven transaxle has a brake that is mechanically set in the absence of power to said motor, and electrically released upon the application of power to said motor.

48. The selectively powered transport device according to claim 41, further comprising an actuator in operative engagement between said second wheel platform and first bogey wheel platform, said actuator effecting deployment and retraction of said drive wheels into and out of engagement with a floor surface.

49. The selectively powered transport device according to claim 48, wherein said free-wheeling castered wheels of said second wheel platform and said first bogey wheel platform are positioned for constant contact with a planar floor surface both when said drive wheels are deployed and retracted.

50. The selectively powered transport device according to claim 49, wherein said free-wheeling castered wheels have a push-pull brake cable extending between at least one castered wheel of said first bogey wheel platform and one castered wheel of said second wheel platform, said push-pull brake cable being operative over a range of states of articulation of said bifurcated base.

51. The selectively powered transport device according to claim 50, wherein each of said second wheel platform and said first bogey wheel platform has a castered wheel with a brake pedal actuator, actuation of either brake pedal engaging or releasing all casters having a brake associated therewith.

52. An attendant controlled and selectively powered transport device, comprising:

a base;

an object support structure mounted to said base for receiving and maintaining an object;

wheels attached to said base; and wherein said base is bifurcated into at least two potions, each said portion having at least one of said wheels attached thereto, said at least two bifurcated portions being in articulating relationship with respect to each other about a horizontal axis.

* * * * *